United States Patent [19]
Cain et al.

[11] 3,958,847
[45] May 25, 1976

[54] BEARING ASSEMBLY

[75] Inventors: Earl S. Cain, Portola Valley; Jerome A. Carlson, Woodside; George E. Goodrich, San Carlos, all of Calif.

[73] Assignee: Tribotech, Redwood City, Calif.

[22] Filed: Jan. 31, 1975

[21] Appl. No.: 545,764

[52] U.S. Cl. .............................. 308/196; 308/184 A
[51] Int. Cl.² .................... F16C 13/00; F16C 33/00
[58] Field of Search ........... 308/196, 188, 193, 197, 308/202, 216, 214, 184 R, 184 A

[56] References Cited
UNITED STATES PATENTS

| | | | |
|---|---|---|---|
| 1,795,471 | 3/1931 | Buckwalter | 308/216 |
| 1,799,447 | 4/1931 | Taylor | 308/216 |
| 1,908,474 | 5/1933 | Dewees | 308/196 |
| 2,201,477 | 5/1940 | Chamberlin | 308/196 |
| 3,606,502 | 9/1971 | DeGermond | 308/196 |
| 3,913,993 | 10/1975 | Ernst | 308/196 |

*Primary Examiner*—M. H. Wood, Jr.
*Assistant Examiner*—Richard A. Bertsch
*Attorney, Agent, or Firm*—Flehr, Hohbach, Test

[57] ABSTRACT

An anti-friction bearing assembly is disclosed which incorporates split race rings secured together by means of a length of adhesive tape. In one embodiment a thin section, double row ball bearing assembly is provided in which the adhesive tape is employed for maintaining the split rings in a preferred circumferential orientation. The tape can flex to accommodate radial excursion of the split rings without inducing distortion forces, while at the same time the tape has sufficient strength to resist axial and torsional forces. The split rings are formed, in different embodiments, in either of the inner or outer race rings. A roller bearing embodiment of the invention employs a race ring comprised of a central segment and opposite end plates which cooperate to define a raceway for the rollers. A pair of adhesive strips secure the end plates to the central segment for handling and installation of the assembly prior to final clamping within a housing or on a shaft.

14 Claims, 4 Drawing Figures

BEARING ASSEMBLY

BACKGROUND OF THE INVENTION

This invention relates to anti-friction bearings, and in particular relates to the construction and assembly of anti-friction bearing assemblies employing split race rings, such as double row ball bearing assemblies. The invention also relates to roller bearing assemblies.

Double row ball bearing assemblies such as those of relatively thin cross-sectional design require a high degree of manufacturing accuracy, as well as careful handling and matching of the component elements during assembly. Presently such bearings are manufactured by procedures in which one or more trial assemblies of the inner and outer race rings are made with ball contact angle or other assembly relationship tests being run after each trial assembly. The trial assemblies are undertaken to establish a preferred assembly relationship including circumferential orientation of the split race rings to achieve proper alignment and load distribution. The assembler makes match marks on the race rings at the preferred circumferential position for purposes of final assembly. The race rings are then secured together for assembly in a bearing housing or onto a shaft by means such as a snap assembly or metal ring.

Conventional bearings of the type described present a number of problems in their manufacture, assembly and use. The metal snap assemblies for holding the race rings in their preferred orientation create difficulties during the multiple trial assemblies. The use of the snap assemblies increases the risk of damage during assembly of the bearing elements, and assembly errors can be introduced from sources such as thermal expansion and contraction during use of the snap assembly. In addition split race rings which are secured together by such snap assemblies can creep circumferentially when loads are applied so that the preferred circumferential orientation is lost.

In certain conventional roller bearing designs one of the race rings is made as an integral piece having a machined groove which forms a raceway for the rollers. The requireement for machining such a groove thereby limits the degree of surface finish, accuracy and roller control which can be achieved in the bearing.

There is thus a requirement for anti-friction bearing assemblies which will obviate the problems encountered with existing bearing designs.

OBJECTS AND SUMMARY OF THE INVENTION

It is a general object of the invention to provide new and improved anti-friction bearing assemblies of both ball and roller bearing design.

Another object is to provide a bearing assembly of the character described which facilitates one or more trial assemblies of the bearing elements to maintain a preferred assembly relationship including circumferential orientation of the split rings for insuring that the measured matching for load distribution and dimensional envelope considerations do not change.

Another object is to provide a bearing assembly of the character described which facilitates one or more trial assemblies with low risk of damage to the elements and which minimizes errors or misalignment of the bearing during final assembly.

Another object is to provide a bearing assembly of the character described which facilitates repetitious assembly of the bearing elements without inducing any dimensional or load variables to the bearing.

Another object is to provide a bearing assembly of the character described which is adapted for use on bearing designs in which either of the inner or outer race rings are split, and in bearings of either ball or roller design.

Another object is to provide a bearing assembly of the character described in which an adhesive tape is employed for holding split race rings together at a preferred circumferential orientation for handling of the bearing and also for final assembly of the bearing in a housing or onto a shaft.

Another object is to provide a bearing assembly of the type described which employs an adhesive tape holding the split rings together with either an axial pre-load or axial clearance.

Another object is to provide a bearing assembly of the type described which employs an adhesive tape holding the split rings together whereby the tape serves as a seal to prevent ingress of foreign matter where there is a gap between the split rings.

Another object is to provide a roller bearing assembly of the type described in which adhesive tape is employed to hold the component elements together prior to installation and final clamping of the bearing.

The invention includes, in summary, a bearing assembly comprising inner and outer race rings between which bearing elements, such as ball or roller bearings, are constrained to run in raceways. In one embodiment employing ball bearings either of the inner or outer race rings are comprised of complementary split ring segments. A flexible elongate locking strip comprising a length of adhesive tape mounts the ring segments together at their preferred circumferential orientation. The tape has sufficient strength and flexibility so as to resist axial and torsional forces while at the same time permitting radial displacement of the ring segments so that radial force restraints are not imposed on the bearing during final assembly even if the split ring segments are not exactly concentrically aligned. In another embodiment a roller bearing assembly is provided in which one of the race rings is composed of a central segment and a pair of end guide plates, each of which can be separately machined and then mounted together by adhesive tape to hold the assembly together for handling and installation prior to final clamping in a housing or onto a shaft.

The foregoing and additional objects and features of the invention will become apparent from the following description in which the preferred embodiments have been set forth in detail in conjunction with the accompanying drawings.

DESCRIPTION OF THE PREFERRED EMBODIMENTS

Figure 1:
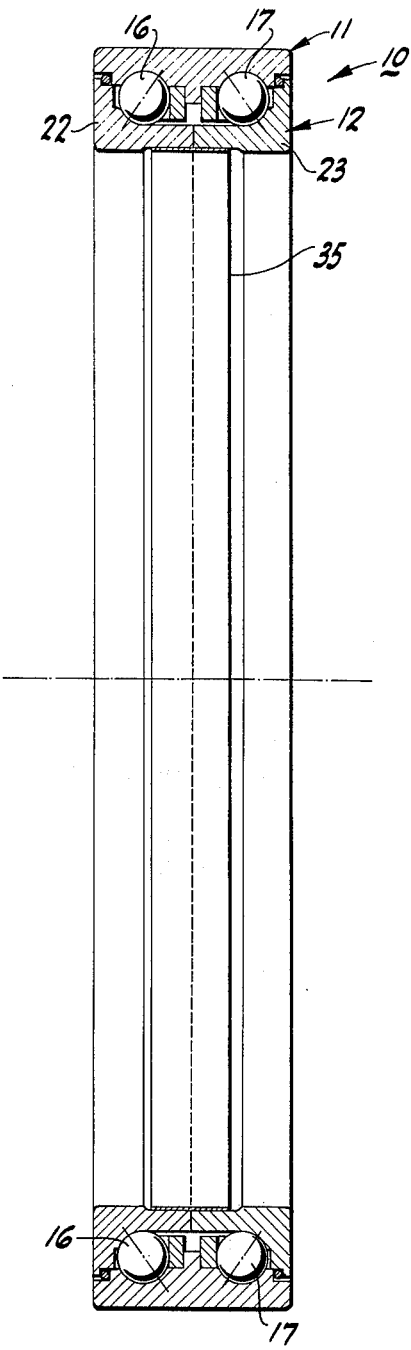
FIG. 1 is an axial cross-sectional view of an embodiment of the invention comprising a double roll ball bearing assembly.

In the drawings FIG. 1 illustrates generally at 10 a double row ball bearing assembly constructed in accordance with the invention. Bearing assembly 10 includes an outer race ring 11 and an inner race ring 12. The outer circumference of ring 11 is machined for mounting in the circular opening of a suitable bearing housing, not shown, while the inner periphery of ring 12 is machined for mounting onto a shaft. A pair of circular cross-section raceways 13, 14 are machined about the inner circumference of the outer ring for supporting respective rows of balls 16, 17. The balls are constrained for movement about the bearing in circumferentially spaced-apart relationship by means of suitable bearing cages 18, 19. An inwardly projecting, centrally disposed rib 21 is formed about the inner circumference of ring 11 and projects between the cages 18 and 19 to position these elements axially of the assembly.

Inner race ring 12 comprises a pair of complementary split ring semgnets 22, 23 which are formed with respective circular cross section raceways 24, 25 for supporting a row of the balls. The split rings are each formed with radially outwardly extending flanges 27, 28 which enclose the sides of the bearing assembly. A pair of inwardly facing annular grooves are formed in opposite ends of outer ring 11, and a complementary pair of outwardly facing annular grooves are formed in the flanges 27, 28 of the split rings. Suitable seal elements such as the elastomeric O-rings 29, 30 are mounted in the spaces between the grooves for purposes of confining a lubricating medium within the bearing, and also for preventing ingress of foreign matter.

The inner side faces of split rings 22 and 23 are ground flat for abutting contact at their interface 32 which lies on a radial plane extending centrally through the bearing. The split rings are also machined about their inner peripheries to form a pair of relatively shallow grooves 33, 34 on opposite sides of interface 32. A flexible elongate locking strip 35 is secured to the surface of the grooves for holding the split rings in assembled relationship for handling of the completed bearing and for installation and final assembly within a bearing housing and on a shaft. Locking strip 35 is relatively thin and is composed of a material providing sufficient shear strength to resist axial and torsional loads between the split rings, while at the same time having relatively weak bending moment strength so that it can flex radially at interface 32 to permit a limited range of radial displacement or excursion between the split rings.

Preferably locking strip 35 comprises a length of suitable adhesive tape, such as contact or pressure sensitive adhesive tape, which includes on one side an adhesive layer 36 which forms a strong bond with the surface of the grooves. The tape backing upon which the adhesive layer is carried can be formed of any suitable flexible material, such as cloth, metal or a synthetic polymer. For example, the adhesive tape could have a backing of the synthetic polymer sold under the trademark Mylar, or the backing could be of a metal, such as aluminum, for heavy duty applications. The tape is of a sufficient length so as to extend around substantially the entire inner circumference of inner ring 12. The depth of the grooves 33, 34 is commensurate with the tape thickness so that the split rings can be mounted on a shaft without interference from the tape.

The use and operation of bearing assembly 10 is as follows. It will be assumed, as an example, that the bearing assembly is made with an 18 inch nominal outer diameter for outer ring 11, and a 16 inch nominal inner diameter for inner ring 12. Sixty-four steel balls 16, 17 of ½ inch diameter are secured by cages 18 and 19 in each row of the assembly. A pressure sensitive adhesive tape 35 is provided which is 0.80 inches in width and 0.005 inches in thickness. During assembly of the bearing the rows of caged balls are placed within the raceways of outer ring 11. The two split rings 22, 23 are then placed together in the illustrated relationship for an initial trial assembly. The assembler then measures assembly relationships that may include the contact angles of the balls, as illustrated by the lines 37 and 38 of FIG. 2, to determine whether there is an optimum matching of the split rings. As required the split rings can be readily separated and interface 32 reworked for a preferred assembly relationship and can be moved to another circumferential orientation. The assembly relationship tests are again run and, if required, the split rings are reworked and/or repositioned for still another trial assembly. When the preferred assembly including the circumferential orientation of the split rings has been established the adhesive tape 36 is mounted within grooves 33, 34 by applying contact pressure through suitable means such as a rubber roller or by hand. The bearing components are thereby secured together for handling, installation and final assembly within a housing and onto a shaft.

Figure 3:
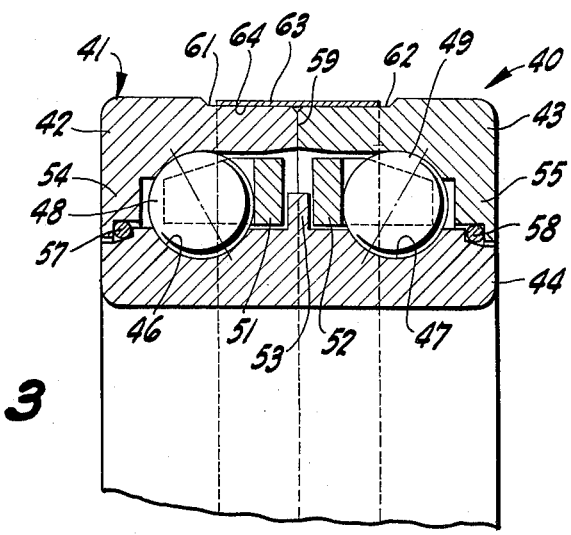
FIG. 3 is a fragmentary axial sectional view similar to FIG. 2 of another embodiment of the invention.

FIG. 3 illustrates another embodiment of the invention providing a double row ball bearing assembly 40. Bearing assembly 40 is similar in construction and operation to the assembly of the embodiment of FIG. 1 except that its outer race ring 41 is comprised of a pair of complementary split ring segments 42, 43 while its inner race ring 44 is a single piece. The inner circumference of inner ring 44 is machined for mounting onto a shaft, while the outer periphery of this ring is machined to form a pair of circular cross-section raceways 46, 47. A plurality of balls 48, 49 are mounted in spaced-apart relationship in two rows within the raceways by a pair of cage assemblies 51, 52. An outwardly projecting central rib 53 formed on the inner ring provides axial spacing for the cages.

The split rings 42 and 43 are formed with annular flanges 54, 55 which enclose the sides of the bearing assembly. A pair of inwardly facing annular grooves are formed in the flanges of the split rings, while a complementary pair of outwardly facing annular grooves are formed in the opposite ends of inner ring 12. A pair of suitable annular seals, preferably the elastomeric O-rings 57, 58, are mounted within the spaces between the grooves of the inner and outer rings.

The two split rings 42 and 43 are machined with flat inner end surfaces which abut at the interface 59 lying in a radial plane extending centrally of the bearing. The outer peripheries of the split rings are machined to form a pair of shallow grooves 61, 62 on opposite sides of interface 59.

The split rings are mounted together by means of a flexible elongate locking strip 63 which is seated within and bonded to the surfaces of grooves 61 and 62 by a suitable adhesive layer 64. Preferably the locking strip comprises a length of adhesive tape, such as the contact or pressure sensitive tape described for the embodiment of FIG. 1. As previously described such a tape should have sufficient shear strength to resist axial and torsional forces between the two split rings while at the same time permitting a limited range of relative radial displacement of these elements.

The use and operation of bearing assembly 40 is similar to that described for the embodiment of FIG. 1 except that initially the two rows of caged balls are assembled onto inner race ring 44. The two outer split rings 42 and 43 are then placed about the balls for an initial trial assembly. Assembly relationship tests including contact angle tests are run on the bearing to determine whether the match of the split rings is optimum. As required, the split rings are reworked and/or moved to a different orientation for another trial assembly, the assembly relationships are tested, and these steps are repeated until the desired assembly including circumferential orientation is achieved. Adhesvie strip 63 is then mounted within the grooves by use of a rubber roller or by hand. Bearing assembly 40 can then be handled and installed for final assembly within the bearing housing and onto a shaft.

Figure 2:
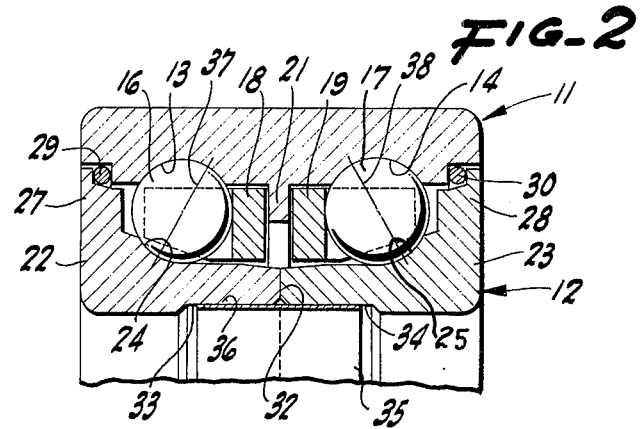
FIG. 2 is a fragmentary axial section view, to an enlarged scale, of the embodiment of FIG. 1.

While the embodiments of FIGS. 1-3 are shown with the split rings in abutting relationship, the invention contemplates an assembly in which the split inner or outer rings are separated axially by a gap. In such case the adhesive tape serves as a seal to prevent ingress of foreign matter. Also, where a low torque is required and a clamp mounting is not mandatory the adhesive tape can be used to maintain a precise axial preload, or a clearance, between the split rings by means of tape shear loading.

Figure 4:
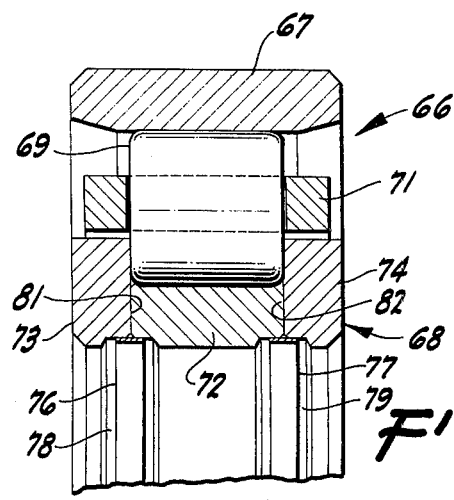
FIG. 4 is a fragmentary axial section view of another embodiment of the invention providing a roller bearing assembly.

In FIG. 4 another embodiment of the invention provides a roller bearing assembly 66. This bearing assembly includes an integral outer race ring 67 and a three-part inner race ring 68. A plurality of rollers 69 are mounted in circumferentially spaced-apart relationship between the rings by a suitable cage 71.

Inner race ring 68 comprises an annular central segment 72 and a pair of annular guide flanges or side plates 73, 74 which project outwardly about the ends of rollers 69. The side plates cooperate with the outer surface of central segment 72 to define a raceway which constrains the rollers for movement about the bearing.

During assembly of bearing 66 the side plates are secured to opposite ends of the central segment by means of a pair of flexible elongate locking strips 76, 77. The locking strips are seated within and secured to respective grooves 78, 79 which are machined about the inner periphery of central segment 72 and about the end plates on opposite sides of the interfaces 81, 82 between these elements. Preferably the locking strips comprise a suitable adhesive tape such as the contact or pressure sensitive adhesive tape described for the embodiment of FIG. 1. The adhesive tapes hold the bearing assembly together for purposes of handling and installation. After installation, for most applications, the side plates are constrained between shoulders formed along a shaft or in a housing without relying on the tapes. Because the roller bearing normally supports only radial loads the tapes could be used as load bearing members to support light axial loads and roller guidance forces where the assembly is unsupported axially.

It will be appreciated that in bearing assembly 66 the side plates 73 and 74 and central segment 72 can be machined separately to obtain higher precision and a better finish than would be attainable in a one-piece construction where the raceway groove would have to be made within the part. As a result the invention provides advantages in surface finish, accuracy and roller control in the completed bearing. The use of the adhesive tapes also permits the bearing assembly to be easily handled prior to final clamping within the housing or onto a shaft. While a three part inner race ring is illustrated in FIG. 4, the invention also contemplates that the outer race ring could similarly be a three part component with the inner ring of integral construction, of both of the inner and outer rings could be of three part construction. In addition, the invention could be used in multi-row roller designs where the adhesive tape is used for holding the multiple race rings together during handling and installation of the bearing assembly.

From the foregoing it is seen that applicants have provided a new and improved invention which obviates many of the problems of existing bearing assemblies. The invention facilitates multiple trial assemblies of a bearing in that a preferred assembly including a circumferential orientation of the split rings can be easily obtained. The adhesive tape holds the rings in that orientation, thereby insuring that the measured matching of the bearing elements for load distribution and dimensional envelope considerations do not change, such as could occur if the rings shifted circumferentially. The adhesive tape has sufficient shear strength to resist axial and torsional forces so as to hold the split rings in proper alignment, but at the same time the tape can flex to accommodate, without inducing undesirable distortion forces, radial excursion of the split rings which could occur if the counterbores of the split rings are not exactly concentric. The provision of the flexible adhesive tape in the invention eliminates the requirement for metal snap assemblies presently used in the manufacture of ball bearings. The elimination of such snap assemblies reduces the risk of damage and errors which could occur during assembly. Moreover, the invention eliminates the circumferential creep between the split rings which could occur when a load is applied to a bearing where metal rings are employed for locking the split rings together. The component elements of the bearing assemblies can be relatively easily and inexpensively manufactured without the requirement for machining complex shapes for the grooves. In addition the split ring locking system of the invention takes a minimum of space.

While the foregoing embodiments are at present considered to be preferred it is understood that numerous variations and modifications may be made therein by those skilled in the art and it is intended to cover in the appended claims all such variations and modifications as fall within the true spirit and scope of the invention.

What is claimed is:

1. In an anti-friction bearing assembly, an inner race ring, an outer race ring, a plurality of circumferentially spaced bearing elements carried between the rings, at least one of said rings comprising a pair of complementary split ring segments which are in facing relationship along a radially extending plane, and flexible elongate locking strip means positioned about a circumference of the ring segments on the opposite sides of the radially extending plane for holding each of said ring segments against relative axial and rotary displacement with respect to each other, said ring segments and locking strip being substantially unrestrained radially whereby the ring segments are free to undergo a limited range of relative radial displacement.

2. An anti-friction bearing assembly as in claim 1 in which the locking strip means comprises a length of tape having a radial thickness which is narrow relative to the axial width thereof whereby the tape provides substantial resistance to torsional shear and axial tension forces and relatively insubstantial resistance to radial forces between the ring segments.

3. A bearing assembly as in claim 1 in which the locking strip means includes a layer of adhesive material disposed in contact with the surface portions of the ring segments.

4. A bearing assembly as in claim 3 in which the locking strip means comprises a length of adhesive tape which has the layer of adhesive material on the side thereof which is in contact with the surface portions of the ring segments.

5. A bearing assembly as in claim 1 in which said locking strip means comprises a length of adhesive tape, and said ring segments are formed with a circumferential groove about the surface portions, said grooves having an axial width commensurate with the axial width of the tape and with the tape being seated within the groove.

6. A bearing assembly as in claim 5 in which the depth of the groove is at least equal to the radial thickness of the tape whereby the ring segments are adapted to be mounted within a bearing housing or onto a shaft without interference from the tape.

7. A bearing assembly as in claim 1 in which the bearing elements comprise a plurality of balls, and means for mounting the balls in circumferential spaced-apart relationship between the inner and outer rings in a pair of axially spaced-apart rows with each ring forming a raceway for the balls of a respective row.

8. A bearing assembly as in claim 1 in which said ring segments are formed in said inner race ring, and said locking strip means is mounted about the inner circumference of said ring segments.

9. A bearing assembly as in claim 1 in which said ring segments are formed in said outer race ring, and said locking strip means is mounted about the outer circumference of the ring segments.

10. In a roller bearing assembly, an inner race ring, an outer race ring, a plurality of circumferentially spaced rollers carried between the rings, at least one of said rings comprising an annular central segment together with a pair of annular side plates positioned on opposite axial ends of the central segment and cooperating therewith to define a raceway for the rollers, and flexibly elongate locking strip means for holding each of the side plates against axial and rotary displacement relative to the ends of the central segment, said side plates and locking strip means being substantially unrestrained radially relative to the central segment whereby the side plates are free to undergo a limited range of radial displacement relative to the central segment.

11. A bearing assembly as in claim 10 in which said locking strip means comprises a length of tape having a radial thickness which is narrow relative to the axial width thereof, and the strip means further includes a layer of adhesive material disposed in contact with the central segment and side plates.

12. A bearing assembly as in claim 11 in which the tape comprises adhesive tape.

13. A bearing assembly as in claim 10 in which the central segment and side plates are formed in the inner race ring, and the locking strip means spans the junctures between the central segment and side plates at their inner circumferences.

14. A double roll ball bearing assembly comprising the combination of an outer race ring, an inner race ring formed into a pair of complementary split rings which are in abutting relationship along a radially extending plane, each split ring cooperating with the outer race ring to form a raceway, a plurality of balls, means for mounting the balls in circumferentially spaced-apart relationship in the raceway between the inner and outer rings in a pair of axially spaced-apart rows, means for forming a groove about the inner periphery of the split rings, a flexible adhesive tape mounted about the groove for securing the split rings together against axial and circumferential displacement, said split rings and adhesive tape being substantially unrestrained radially whereby each of the split rings are free to undergo a limited range of radial displacement with respect to each other.

* * * * *